United States Patent
No

(10) Patent No.: US 10,065,620 B2
(45) Date of Patent: Sep. 4, 2018

(54) ELECTRONIC PARKING BRAKE SYSTEM IN VEHICLE AND CONTROL METHOD THEREOF

(71) Applicant: MANDO CORPORATION, Gyeonggi-do (KR)

(72) Inventor: Su-Hwan No, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 22 days.

(21) Appl. No.: 15/097,281

(22) Filed: Apr. 12, 2016

(65) Prior Publication Data

US 2016/0297410 A1  Oct. 13, 2016

(30) Foreign Application Priority Data

Apr. 13, 2015  (KR) .................. 10-2015-0051812

(51) Int. Cl.
| | |
|---|---|
| *B60T 8/172* | (2006.01) |
| *B60T 1/00* | (2006.01) |
| *B60T 13/74* | (2006.01) |
| *B60T 13/66* | (2006.01) |

(52) U.S. Cl.
CPC .......... *B60T 13/741* (2013.01); *B60T 13/662* (2013.01)

(58) Field of Classification Search
None
See application file for complete search history.

(56) References Cited

U.S. PATENT DOCUMENTS

| | | | | |
|---|---|---|---|---|
| 8,622,179 | B2* | 1/2014 | Watanabe | B60T 7/042 188/1.11 E |
| 2009/0315391 | A1* | 12/2009 | Tanaka | B60T 8/3655 303/113.5 |
| 2011/0278108 | A1* | 11/2011 | Watanabe | B60T 7/042 188/72.3 |
| 2013/0261917 | A1* | 10/2013 | Kotake | B60T 13/741 701/70 |

* cited by examiner

*Primary Examiner* — Mussa A Shaawat
*Assistant Examiner* — Kyung J Kim
(74) *Attorney, Agent, or Firm* — Ladas & Parry, LLP

(57) ABSTRACT

Disclosed herein are an electronic parking brake system and a method of controlling the same. The electronic parking brake system includes a parking brake driving part applying or releasing a parking brake of a vehicle, and a control part configured to control the parking brake driving part. The control part ends a release operation of the parking brake based on an apply time interval of the parking brake, a time interval between a release operation start point of the parking brake and a time point when arrived on a predetermined current level, and a current applied to the parking brake.

13 Claims, 8 Drawing Sheets

ELECTRONIC PARKING BRAKE SYSTEM IN VEHICLE AND CONTROL METHOD THEREOF

CROSS-REFERENCE TO RELATED APPLICATION

This application claims the priority to Korean Patent Application No. 10-2015-0051812, filed on Apr. 13, 2015 in the Korean Intellectual Property Office, the disclosure of which is incorporated herein by reference in its entirety.

BACKGROUND

1. Field

Embodiments of the present invention relate to an electronic parking brake system in a vehicle and a control method thereof, and more particularly, to an electronic parking brake which stably performs a braking operation by estimating a successive range of applying and releasing of the electronic parking brake in a vehicle.

2. Description of the Related Art

In general, a brake system, as a means for decelerating a vehicle speed or stopping a vehicle, is provided at the vehicle for transportation and movement.

The brake system is classified into a driving brake which decelerates and stops a running vehicle, and a parking brake which is used when the vehicle is parked.

Here, the parking brake is an apparatus which keeps a stopped vehicle from moving, and is referred to as a hand brake or a side brake. When a parking brake lever is pulled, a rear brake shoe lever is moved by a parking cable, and a lining is in close contact with a drum, and thus a braking state may be maintained.

The parking brake uses a mechanical structure in which the cable is typically pulled and released using the lever and an operation is released. However, an operating method of the parking brake according to an operation of the parking lever is operated by only a user's intention, and thus when the vehicle is parked on a slope way in a state in which the parking lever is not pulled due to the user's carelessness, the vehicle may move downward, and may cause an unexpected accident. Also, since a driver should operate the parking lever whenever parking or driving the vehicle, it is very inconvenient to use the parking brake, and particularly, it is inconvenient for weak women and elders to use it.

Therefore, recently, an electronic parking brake (EPB) which is controlled with a switch operation instead of the lever operation and thus enhances driver convenience and interior beauty is applied.

In the electronic parking brake (EPB) system, even when the driver does not manually apply the parking brake, the parking brake may be automatically applied or released according to the simple switch operation or a control determination of an electronic control unit which controls an entire operation.

The EPB system includes an actuator which has a motor for generating a braking force, and the electronic control unit (ECU) which drives the actuator. The ECU includes a control part, a plurality of sensor interfaces, a motor drive and a communication module. The ECU drives the actuator according to a switch operation state, and applies or releases the EPB system.

However, a technical development which accurately finds an applying and releasing point of time, and determines an applying time of the brake, and thus reduces a control error is being progressed.

SUMMARY

Therefore, it is an aspect of the present invention to provide an electronic parking brake system in a vehicle, which estimates a movement distance and a position of a spindle inside a parking brake through a control algorithm for estimating a speed of a motor based on a current and an applied voltage of the motor, and thus an applying and releasing operation of the brake is performed at an accurate time, and an accurate releasing point of time is found, and a control method thereof.

Also, it is an aspect of the present invention to provide an electronic parking brake system in a vehicle, which reduces a conventional releasing time by ensuring a point of time which is not affected by factors, such as a voltage and a pressure, having an influence on a drag phenomenon of the parking brake, and a control method thereof.

Additional aspects of the invention will be set forth in part in the description which follows and, in part, will be obvious from the description, or may be learned by practice of the invention.

In accordance with one aspect of the present invention, an electronic parking brake system includes a parking brake driving part applies or releases a parking brake of a vehicle; and a control part configured to control the parking brake driving part; wherein the control part ends a release operation of the parking brake based on a apply time interval of the parking brake, a time interval between a release operation start point of the parking brake and a time point when arrived on a predetermined current level, and a current applied to the parking brake.

The system may end the release operation of the parking brake based on the apply time interval of the parking brake, the time interval between the release operation start point of the parking brake and the time point when arrived on the predetermined current level, and the current applied to the parking brake by controlling a apply movement distance of spindle of the parking brake and a release movement distance of spindle of the parking brake to the same.

The control part may determines a third movement distance of the spindle after the applied current arrived to the predetermined current level based on a first movement distance of the spindle when applies the brake, and a second movement distance of the spindle when releases the brake until the applied current arrived to the predetermined current level.

The movement distance of the spindle may be calculated based on a current applied to a motor and a voltage applied to the motor.

The control part may end the release operation of the parking brake after a movement time interval by calculated the movement time interval while the spindle moves the third movement distance.

The control part may control a maximum distance in the applying operation of the spindle and the release movement distance of the spindle to the same when the parking brake is not applied within a normal range.

The control part may adjust the release movement distance of the spindle is longer than the maximum distance in the applying operation of the spindle of the parking brake, after controlling the maximum distance in the applying operation of the spindle and the release movement distance of the spindle to the same when determines the parking brake is not applied within the normal range.

In accordance with another aspect of the present invention, a method of controlling an electronic parking brake system includes calculating a time interval of applying operation when applies the parking brake; calculating a time interval between a release operation start point of the parking brake and a time point when arrived on a predetermined current level when releases the parking brake; measuring a current being applied in the parking brake; ending a release operation of the parking brake based on the time interval of applying operation of the parking brake, the time interval between the release operation start point of the parking brake and the time point when arrived on the predetermined current level, a current applied to the parking brake.

The method may end the release operation of the parking brake based on the apply time interval of the parking brake, the time interval between the release operation start point of the parking brake and the time point when arrived on the predetermined current level, and the current applied to the parking brake by controlling a apply movement distance of spindle of the parking brake and a release movement distance of spindle of the parking brake to the same.

The method may further comprises, calculating a first movement distance of the spindle when applies the brake; calculating a second movement distance of the spindle when releases the brake until the applied current arrived to the predetermined current level; and determining a third movement distance of the spindle after the applied current arrived to the predetermined current level based on the first movement distance of the spindle and the second movement distance of the spindle.

The method may end the release operation of the parking brake after a movement time interval by calculated the movement time interval while the spindle moves the determined third movement distance.

The method may control a predetermined maximum distance in the applying operation of the spindle and the release movement distance of the spindle to the same when the parking brake is determined as not applied within a normal range.

The method may adjust the release movement distance of the spindle is longer than the maximum distance in the applying operation of the spindle of the parking brake, after controlling the maximum distance in the applying operation of the spindle and the release movement distance of the spindle to the same when determines the parking brake is not applied within the normal range.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
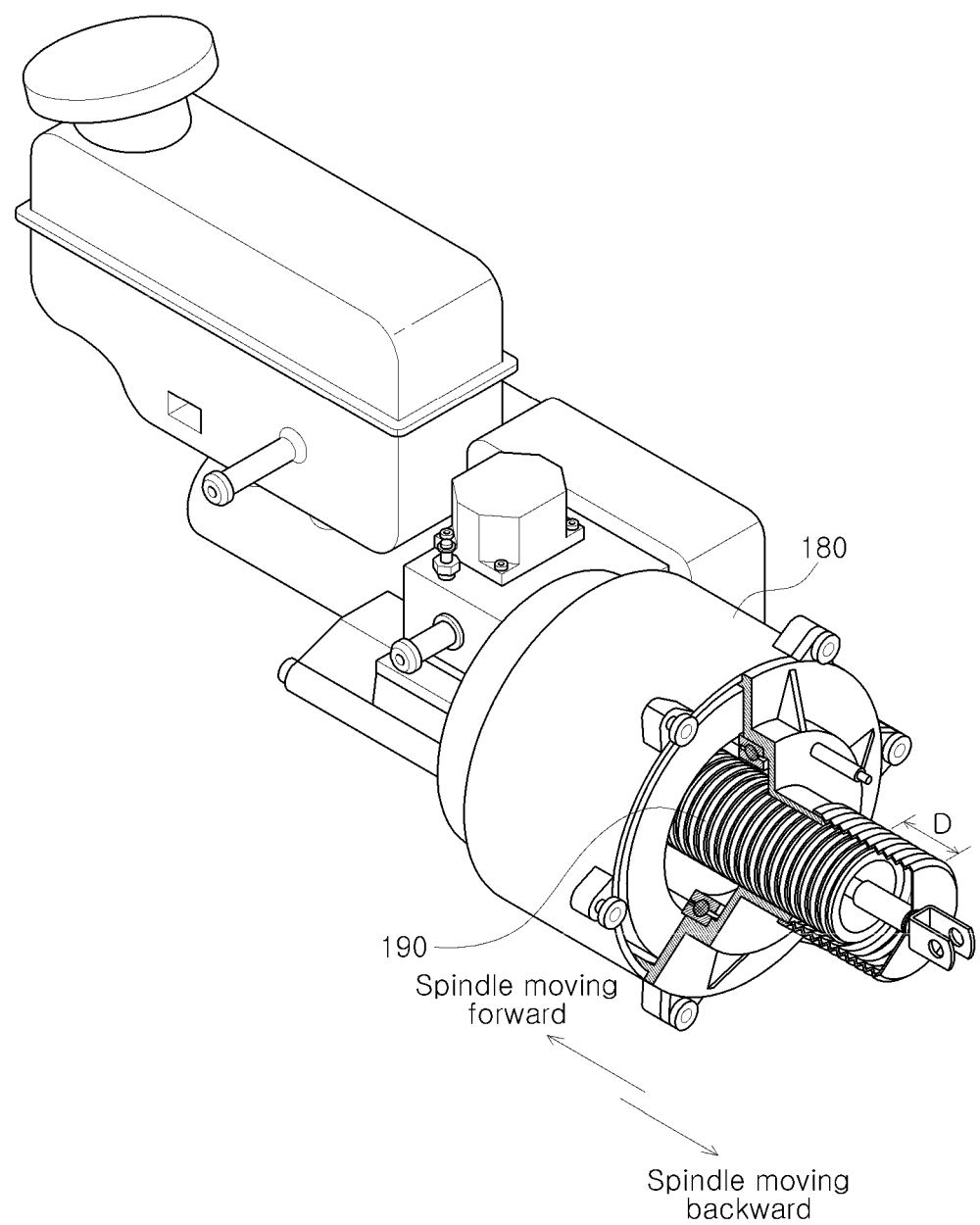
FIG. 1 is a perspective view illustrating an electronic parking brake in accordance with a first embodiment of the present invention.

Hereinafter, exemplary embodiments of the present invention will be described in detail with reference to the accompanying drawings. The exemplary embodiments described below are provided as examples to sufficiently transfer the spirits of the invention to those skilled in the art. Accordingly, the present invention is not limited to those embodiments described below and can be embodied in different forms.

In addition, in the drawings, explanatorily irrelevant portions are omitted to clearly describe the present invention, and the size of an element could be exaggerated for convenience.

According to one embodiment of the present invention, FIG. 1 is a cross-sectional view of a brake which may be used in one embodiment of the present invention.

FIG. 1 is a perspective view of the brake which is used in one embodiment of the present invention.

A motor 180 transmits power for generating a brake pressure (braking pressure). Also, in order for the motor 180 to transmit the power for generating the braking pressure, a spindle 190 is moved forward or backward in a rotational direction of the motor 180.

Figure 4:
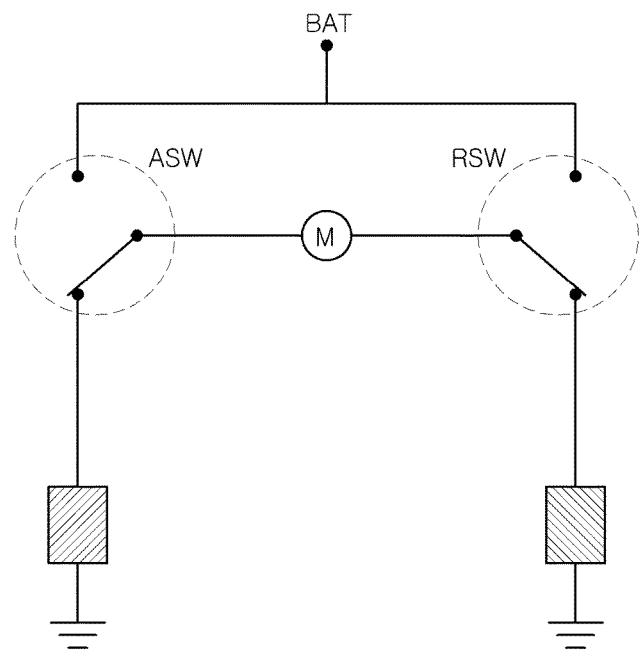
FIG. 4 is a schematic view of a circuit of an electronic parking brake driving part of the electronic parking brake system according to the present invention.

That is, forward movement of the spindle 190 due to rotation of the motor 180 is that a corresponding brake is applied, and backward movement of the spindle 190 is that the corresponding brake is released. As illustrated in FIG. 4, this means that an applying switch (ASW) and a releasing switch (RSW) connected to the motor 180 may rotate the motor 180 in directions opposite to each other.

At this point, due to the rotation of the motor 180, the spindle 190 is moved, and the forward movement and the backward movement are repeated, and thus a movement distance D is generated. When the brake is applied, and the spindle 190 is moved by the movement distance D, but not released by the movement distance D, the releasing is not accurately performed, and thus there is a problem that a drag phenomenon of a vehicle occurs. Therefore, to solve the problem, it is important to accurately find an ending point of time of the releasing of the spindle 190.

Figure 2:
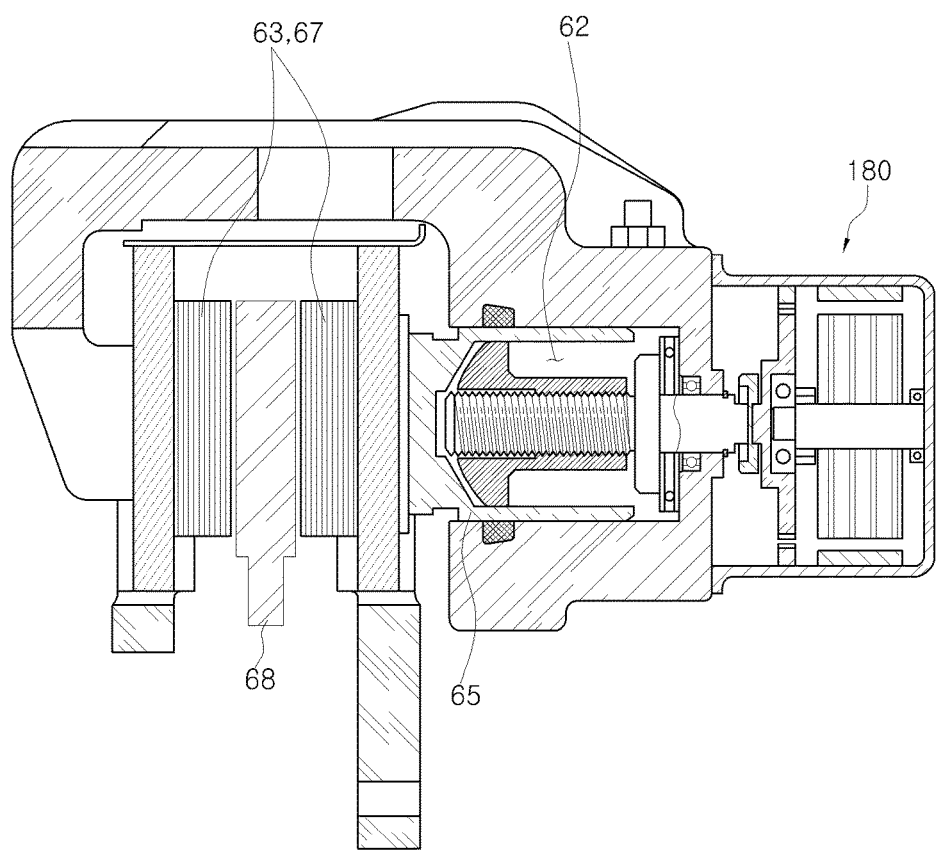
FIG. 2 is a cross-sectional view of the electronic parking brake in accordance with a first embodiment of the present invention.

Also, a state in which a brake disc 68 is pressed through the forward movement or the backward movement of the spindle 190 may be schematically described through a cross-sectional view of the electronic parking brake illustrated in FIG. 2.

A brake body includes a cylinder 62 to which a hydraulic pressure generated from a master cylinder is supplied, a caliper housing to which a pad plate having brake pads 63 and 67 attached to one side thereof is fixed, a piston 65 which is inserted into the cylinder 62 to be linearly moved by the hydraulic pressure supplied to the cylinder 62, and the pad plate which is installed at an end of the piston 65 and to which the brake pads 63 and 67 are attached, and the brake disc 68 which is disposed between the two brake pads 63 and 67 and installed at a drive shaft.

The brake piston 65 transmits an operation force to the brake pad 67 while moving along a rotating axial line of the motor 180.

When the motor 180 of the electronic parking brake is rotated, the brake piston 65 performs a translation motion in a direction in parallel with a rotating shaft of the motor 180. The brake piston 65 is moved toward the brake pad 67, and is in contact with the brake pad 67, and thus the brake pad 67 presses the brake disc 68.

Also, while the brake pad 67 of the pair of brake pads 63 and 67, which is located in the same direction as that of the brake piston 65, presses the brake disc 68 due to the brake piston 65, the caliper housing is moved in a direction opposite to a moving direction of the brake piston 65 by a repulsive force. At this point, the opposite brake pad 63 also presses the brake disc 68.

As a result, the pair of brake pads 63 and 67 bidirectionally presses the brake disc 68, and generates a braking force due to a frictional force between the brake pads 63 and 67 and the brake disc 68.

Figure 3:
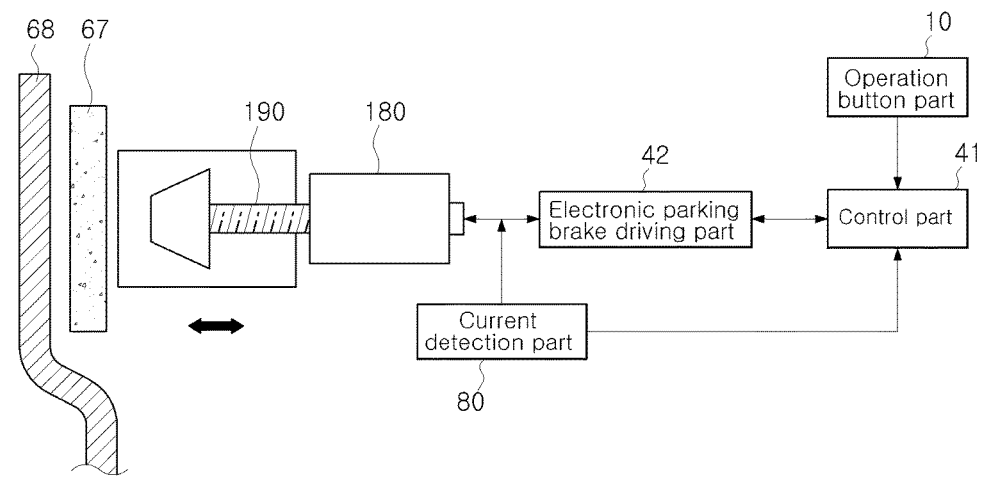
FIG. 3 is a block diagram of an electronic parking brake system in accordance with a first embodiment of the present invention.

FIG. 3 is a block diagram of an electronic parking brake system 1 according to one embodiment of the present invention. FIG. 4 is a schematic view of a circuit of an electronic parking brake driving part 42 of the electronic parking brake system 1 according to the present invention.

As illustrated in the drawings, the spindle 190 of the electronic parking brake system 1 may be moved toward the brake disc 68, or may be moved in a direction opposite to the brake disc 68.

The electronic parking brake system 1 includes a control part 41 which controls driving of the vehicle, and also receives a signal of an operation button part 10, and generates a control signal for realizing a parking operation, the electronic parking brake driving part 42 which receives the control signal of the control part 41 and drives the electronic parking brake, the motor 180 which is rotated in a normal direction or a reverse direction according to a control signal of the applying switch ASW or the releasing switch RSW of the electronic parking brake driving part 42, the spindle 190 which is rotated in the same direction as a rotating direction of the motor 180 and moved forward, the piston 65 which is linearly moved forward or backward according to a movement of the spindle 190, the brake pad 67 which is moved toward the brake disc 68 and presses the brake disc 68 according to a movement of the piston 65, and a current detection part 80 which detects a current applied to the motor 180.

The control part 41 estimates the movement distance of the spindle 190 based on a voltage applied to the motor 180 and a current applied to the motor 180 when the electronic parking brake system 1 is applied. The voltage is applied to the motor 180 through a battery (not shown), and the control part 41 recognizes the voltage of the battery in advance.

That is, the control part 41 may estimate a position of the spindle 190 which is repeatedly applied and released by the rotation of the motor 180. To estimate the position of the spindle 190, the current and the voltage applied to the motor 180 are detected.

Also, the releasing point of time of the motor 180 is calculated based on the estimated position of the spindle 190.

By calculating the releasing point of time according to the present invention, a no-load point of time which is not affected by factors, such as a voltage and a pressure, having an influence on the drag phenomenon of the motor 180 is ensured, and thus the releasing time may be reduced.

The current detection part 80 detects the current applied to the motor 180 through the control part 41. Here, the control part 41 may be an electronic parking brake electronic control unit (EPB ECU).

Since the current is applied to the motor 180 through the control part 41, the current applied to the motor 180 may be measured at a rear end of the electronic parking brake driving part 42. Also, the measured current may be transmitted to the control part 41.

Meanwhile, the movement distance of the spindle 190 is associated with the braking force. The braking force is increased in proportion to the movement distance of the spindle 190 in a direction of the brake pad 67, and also decreased in proportion to the movement distance of the spindle 190 in a direction opposite to the brake pad 67.

As illustrated in FIG. 4, the electronic parking brake driving part 42 includes an applying and releasing signal and a circuit, and controls the parking brake to be applied or released.

In the case in which the applying switch (ASW) or the releasing switch (RSW) are operated, when the applying switch (ASW) is switched off, the releasing switch (RSW) is switched on, and when the applying switch (ASW) is switched on, the releasing switch (RSW) is switched off.

Therefore, when the applying switch (ASW) is operated, the motor 180 is rotated in an applying direction through power applied through the battery, and the brake piston 65 performs the translation motion in the direction in parallel with the rotating shaft of the motor 180. Therefore, the brake piston 65 is moved toward the brake pad 67, and is in contact with the brake pad 67, and thus the brake pads 63 and 67 press the brake disc 68.

On the contrary, when the releasing switch (RSW) is operated, the motor 180 is rotated in a releasing direction through the power applied through the battery, and the brake piston 65 performs the translation motion in the direction in parallel with the rotating shaft of the motor 180. Therefore, the brake piston 65 is moved in the direction opposite to the brake pad 67, and thus the brake pad 67 releases the brake disc 68.

Figure 5:
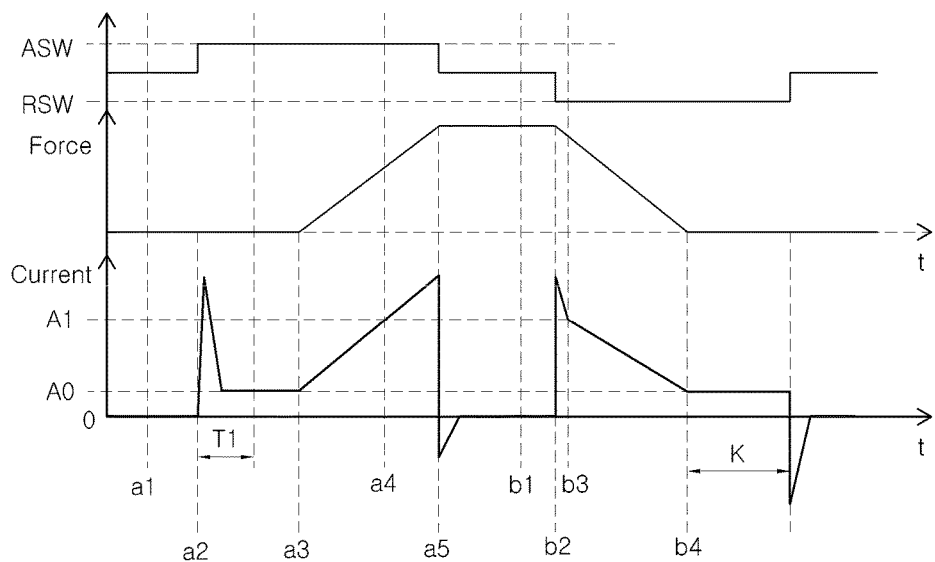
FIG. 5 is a block diagram of a control part of the electronic parking brake system in accordance with a first embodiment of the present invention.

FIG. 5 is a view illustrating a characteristic curve of an example of a parking brake switch and a change in a current of a motor actuator according to a time.

At a point a1 of a time axis, the applying switch is not switched on, and the current flowing to the motor actuator is 0. At a point a2 of the time axis, the applying switch is switched on, and the control part 41 of the parking brake outputs the control signal which enables the piston 65 to press the brake disc 68, and the applying switch is switched on by the control signal.

At this time, since the motor actuator is changed from a stopped state to a driving state, a high current is generated once, and after the motor actuator is in the driving state, the current flowing to the motor actuator is gradually reduced.

Then, when a force generated by driving of the motor actuator is increased, and the brake pads 63 and 67 press the brake disc 68, the current flowing to the motor actuator is gradually increased for a time of a3 to a4.

Then, when the flowing current is maintained at a predetermined level $A_1[A]$ or more (at a point a4 to a5), an applying operation is completed so that the current does not flow to the motor actuator any more.

Next, a control process which is performed at the control part 41 during a releasing operation will be described.

At a point b1 of the time axis, the releasing switch is not switched on, and the current flowing to the motor actuator is maintained at 0.

At a point b2 of the time axis, the releasing switch is switched on, and the control part 41 of the parking brake outputs the control signal which enables the piston 65 to be moved in a direction which becomes distant from the brake disc 68, and the releasing switch is switched on by the control signal.

At this point, since the motor actuator is changed from the stopped state to the driving state, the high current is generated once, and after the motor actuator is in the driving state, the current flowing to the motor actuator is gradually reduced.

Then, when the force generated by driving of the motor actuator is reduced, and the brake pads 63 and 67 become distant from the brake disc 68, the current flowing to the motor actuator is gradually reduced for a time of b3 to b4.

Then, after a predetermined time K[sec] at which the flowing current is maintained at a predetermined current value $A_0$, the high current is generated once in an opposite direction so that the current does not flow to the motor actuator any more, and the current is maintained at 0, and the releasing operation is completed.

However, in the case of a related art, since the predetermined time K at which the flowing current is maintained at a predetermined current value $A_0$ is set, there was a problem that the movement distance of the spindle 190 due to the releasing operation is different from that of the spindle 190 due to the applying operation.

Figure 6:
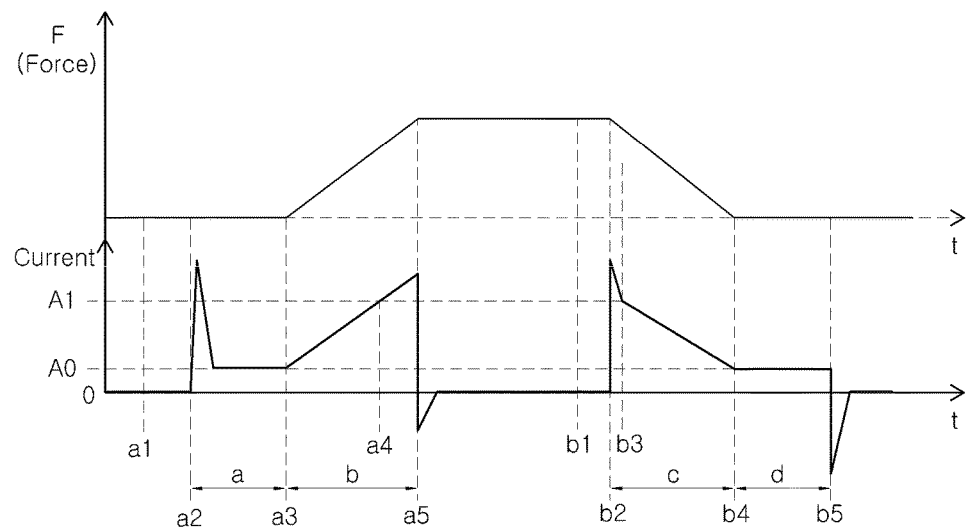
FIG. 6 is a view illustrating the characteristic curve of an example of the parking brake switch and the change in the current of the motor actuator according to the time when the parking brake according to the present invention is applied and released.

According to the present invention, to solve the problem, a time for each of the applying operation and the releasing operation is periodically calculated. FIG. 6 is a view illustrating the characteristic curve of an example of the parking brake switch and the change in the current of the motor actuator according to the time when the parking brake according to the present invention is applied and released.

At the point a1 of a time axis, the applying switch is not switched on, and thus the current flowing to the motor actuator is 0.

At a point a2 of the time axis, the applying switch is switched on, and the control part 41 of the parking brake outputs the control signal which enables the piston 65 to press the brake disc 68. At this point, since the motor actuator is changed from the stopped state to the driving state, the high current is generated once, and after the motor actuator is in the driving state, the current flowing to the motor actuator is gradually reduced, and since the braking force is not generated during a predetermined time, the current is constantly maintained.

A section at which the current is constantly maintained may be maintained for a time of a[sec].

After the time of a[sec] at which the current is constantly maintained, when the force generated by the driving of the motor actuator is increased, and the brake pads 63 and 67 press the brake disc 68, the current flowing to the motor actuator is gradually increased for a time of a3 to a4.

Then, when the flowing current is maintained at a predetermined level $A_1$[A] or more, the current does not flow to the motor actuator any more at a point a5, and the applying operation is completed.

That is, sections a3 to a5 may be continued for a time of b[sec].

Next, the control process which is performed at the control part 41 during the releasing operation will be described.

At a point b1 of the time axis, the releasing switch is not switched on, and thus the current flowing to the motor actuator is maintained at 0. At a point b2 of the time axis, when the releasing switch is switched on, the control part 41 of the parking brake outputs the control signal which enables the piston 65 to be moved in a direction which becomes distant from the brake disc 68. At this point, since the motor actuator is changed from the stopped state to the driving state, the high current is generated once, and after the motor actuator is in the driving state, the current flowing to the motor actuator is gradually reduced.

Then, when the force generated by driving of the motor actuator is reduced, and the brake pads 63 and 67 become distant from the brake disc 68, the current flowing to the motor actuator is gradually reduced for a time of b2 to b4.

That is, sections b2 to b4 may be continued for a time of c[sec].

Then, after a predetermined time d at which the flowing current is maintained at the predetermined current value $A_0$, the high current is generated once in the opposite direction so that the current does not flow to the motor actuator any more, and then the current is maintained at 0[A], and the releasing operation is completed.

The time d at which the flowing current is maintained at the predetermined current value $A_0$ may be calculated by the following Equation 1.

$$d[sec]=\{a[sec]*x1+b[sec]*(x1+x2)/2-c[sec]*(x2+x3)/2\}/x4 \quad \text{(Equation 1)}$$

Here, x1 is a moving speed of the spindle when the braking force is not generated after the applying switching is operated and the current value is constantly maintained, x2 is the moving speed of the spindle when the current has the predetermined value $A_1$, x3 is the moving speed of the spindle at a point of time when the braking force is 0 after the releasing switch is operated, and x4 is the moving speed of the spindle when the predetermined current value $A_0$ is maintained after the releasing switch is operated.

However, the moving speed of the spindle corresponding to each of x1 to x4 may be calculated with reference to a look-up table related to an RPM of the motor and the movement distance of the spindle stored in a memory of the control part 41 using the voltage value and the current value applied to the motor.

Therefore, like Equation 1, even when the brake is repeatedly applied and released, the releasing point of time is repeatedly calculated, and thus an error between the applying operation and the releasing operation may be reduced.

However, the control part 41 may determine whether the electronic parking brake system is applied within a normal range through the movement distance of the spindle 190 estimated through the current applied to the motor 180 and the voltage applied to the motor 180 when the electronic parking brake system is applied.

For example, when the movement distance of the spindle 190 estimated through a current amount applied to the motor 180 and a voltage amount applied to the motor 180 does not exceed a preset minimum critical distance, the control part 41 may determine that the electronic parking brake system is not applied within an effective range.

Like this, when the electronic parking brake system is not applied within the normal range, a method of calculating the releasing point of time will be described later.

At this point, the control part 41 applies a preset maximum distance in the applying operation of the electronic parking brake system, and controls the releasing operation based on the preset maximum distance.

That is, the control part 41 sets the maximum distance $MAX_{apply}$ in the applying operation of the electronic parking brake system, and controls the spindle 190 to be released by the maximum distance $MAX_{apply}$ when the releasing operation is performed.

Therefore, according to Equation 2 which will be described below, the current is maintained at the constant current value $A_0$ when the releasing operation is performed, and the releasing operation may be completed.

$$d[\sec]=\{MAX_{apply}-c[\sec]*(x2+x3)/2\}/x4 \quad \text{(Equation 2)}$$

Here, x2 is the moving speed of the spindle when the current has the predetermined value $A_1$, x3 is the moving speed of the spindle at a point of time when the braking force is 0 after the releasing switch is operated, and x4 is the moving speed of the spindle when the predetermined current value $A_0$ is maintained after the releasing switch is operated.

However, the moving speed of the spindle corresponding to each of x2 to x4 may be calculated with reference to the look-up table related to the RPM of the motor and the movement distance of the spindle stored in the memory of the control part 41 using the voltage value and the current value applied to the motor.

Therefore, as described in Equation 2, even when it is determined that the brake is not applied within the effective range, the releasing point of time may be theoretically calculated.

Then, an adjustment operation of the electronic parking brake system will be described.

At this point, the adjustment operation is a control operation of the electronic parking brake system after the spindle 190 is released according to Equation 2.

At the point a1 of the time axis, the applying switch is not switched on, and thus the current flowing to the motor actuator becomes 0.

At a point a2 of the time axis, the applying switch is switched on, and the control part 41 of the parking brake outputs the control signal which enables the piston 65 to press the brake disc 68. At this point, since the motor actuator is changed from the stopped state to the driving state, the high current is generated once, and after the motor actuator is in the driving state, the current flowing to the motor actuator is gradually reduced, and since the braking force is not generated during a predetermined time, the current is constantly maintained.

At this point, the control part 41 sets the section, at which the current is constantly maintained, to be continued for $a_{thr}[\sec]$. After the time of $a_{thr}[\sec]$ at which the current is constantly maintained, the force generated by the driving of the motor actuator is increased, and the brake pads 63 and 67 press the brake disc 68, and the current flowing to the motor actuator is gradually increased for the time of a3 to a4.

Then, when the flowing current is maintained at the predetermined level $A_1[A]$ or more, the current does not flow to the motor actuator any more at the point a5, and the applying operation is completed.

That is, sections a3 to a5 is continued for the time of b[sec].

Next, the control process which is performed at the control part 41 during the releasing operation will be described.

At the point b1 of the time axis, the releasing switch is not switched on, and thus the current flowing to the motor actuator is maintained at 0. At the point b2 of the time axis, when the releasing switch is switched on, the control part 41 of the parking brake outputs the control signal which enables the piston 65 to be moved in a direction which becomes distant from the brake disc 68. At this point, since the motor actuator is changed from the stopped state to the driving state, the high current is generated once, and after the motor actuator is in the driving state, the current flowing to the motor actuator is gradually reduced.

Then, when the force generated by driving of the motor actuator is reduced, and the brake pads 63 and 67 become distant from the brake disc 68, the current flowing to the motor actuator is gradually reduced for the time of b2 to b4.

That is, the sections b2 to b4 may be continued for the time of c[sec].

Then, after the predetermined time d at which the flowing current is maintained at the predetermined current value $A_0$, the high current is generated once in the opposite direction so that the current does not flow to the motor actuator any more, and then the current is maintained at 0[A], and the releasing operation is completed.

The time d at which the flowing current is maintained at the predetermined current value $A_0$ and which should be minimally maintained may be calculated by the following Equation 3.

$$d[\sec]>\{a_{thr}[\sec]*x1+b[\sec]*(x1+x2)/2-c[\sec]*(x2+x3)/2\}/x4 \quad \text{(Equation 3)}$$

Here, x1 is a moving speed of the spindle when the braking force is not generated after the applying switching is operated and the current value is constantly maintained, x2 is the moving speed of the spindle when the current has the predetermined value $A_1$, x3 is the moving speed of the spindle at a point of time when the braking force is 0 after the releasing switch is operated, and x4 is the moving speed of the spindle when the predetermined value $A_0$ is maintained after the releasing switch is operated.

However, the moving speed of the spindle corresponding to each of x1 to x4 may be calculated with reference to the look-up table related to the RPM of the motor and the movement distance of the spindle stored in the memory of the control part 41 using the voltage value and the current value applied to the motor.

Therefore, as described in Equation 3, even when the applying operation and the releasing operation are controlled and it is determined that the brake is not applied within the effective range, the releasing point of time is theoretically calculated, and then the adjustment operation of the electronic parking brake system according to the present invention may be performed.

Figure 7:
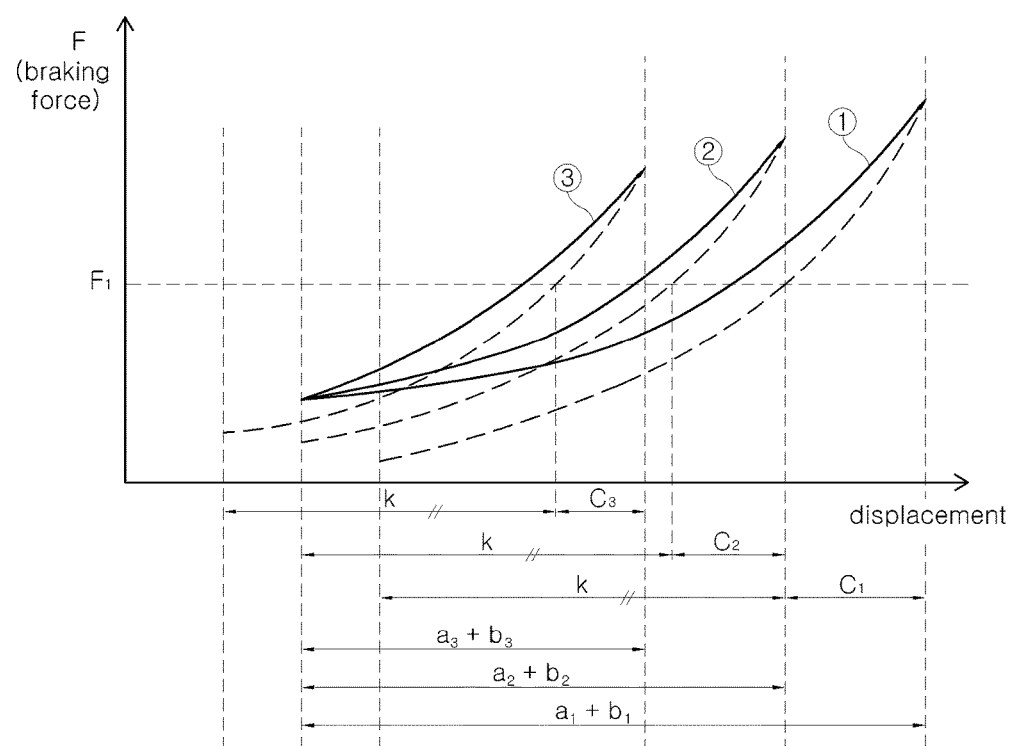
FIG. 7 is a schematic graph illustrating the braking force when a conventional parking brake is applied and released.
Figure 8:
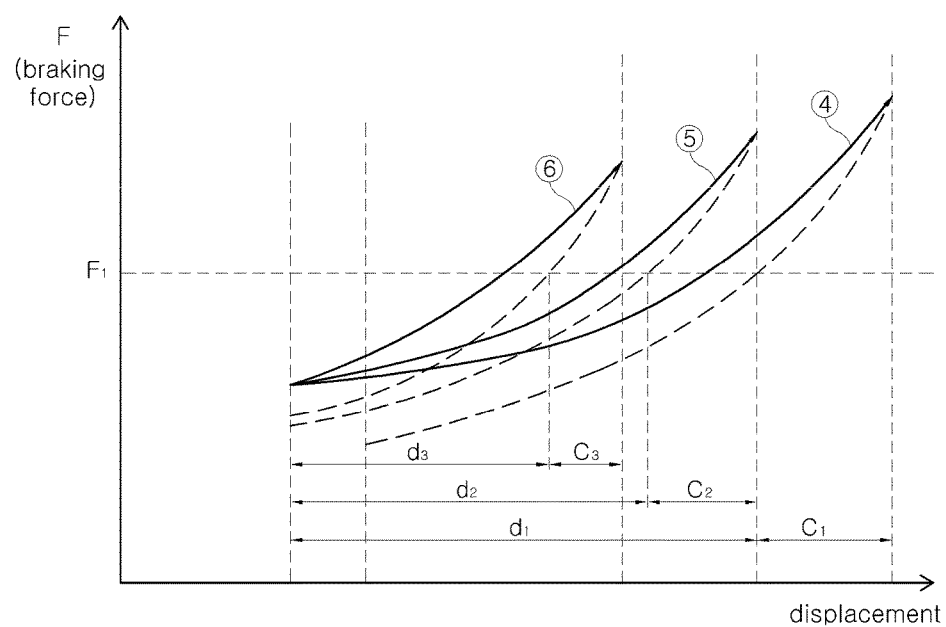
FIG. 8 is a schematic graph illustrating the braking force when the parking brake according to the present invention is applied and released.

FIG. 7 is a schematic graph illustrating the braking force when a conventional parking brake is applied and released, and FIG. 8 a schematic graph illustrating the braking force when the parking brake according to the present invention is applied and released.

In the case of a related art, since the predetermined time K at which the flowing current is maintained at the predetermined current value $A_0$ is set, there was a problem that the movement distance of the spindle 190 due to the releasing operation is different from that of the spindle 190 due to the applying operation. That is, in the case of ①, after a displacement corresponding to a1+b1 from an operation of the applying switch, when the current reaches the predetermined current value $A_0[A]$ due to the operation of the releasing switch, and then the releasing operation is released, the movement distance K is a constant, and thus an error from a start point of time of the applying operation occurs.

Even in the cases of ② and ③, after a displacement corresponding to a2+b2 or a3+b3 from the operation of the applying switch, when the current reaches the predetermined current value $A_0$ due to the operation of the releasing switch, and then the releasing operation is released, the movement distance K is a constant, and thus the error from the start point of time of the applying operation occurs.

However, according to the present invention, as illustrated in FIG. 7, even though the movement distances a1+b1, a2+b2 and a3+b3 are different from each other in each of the applying operations of ④, ⑤ and ⑥, each of the movement distances corresponding to d*x4 (d1 [sec] to d3[sec]) is calculated according to Equation 1, and thus the error of the movement distance depending on the applying operation and the releasing operation may be reduced.

Figure 9:
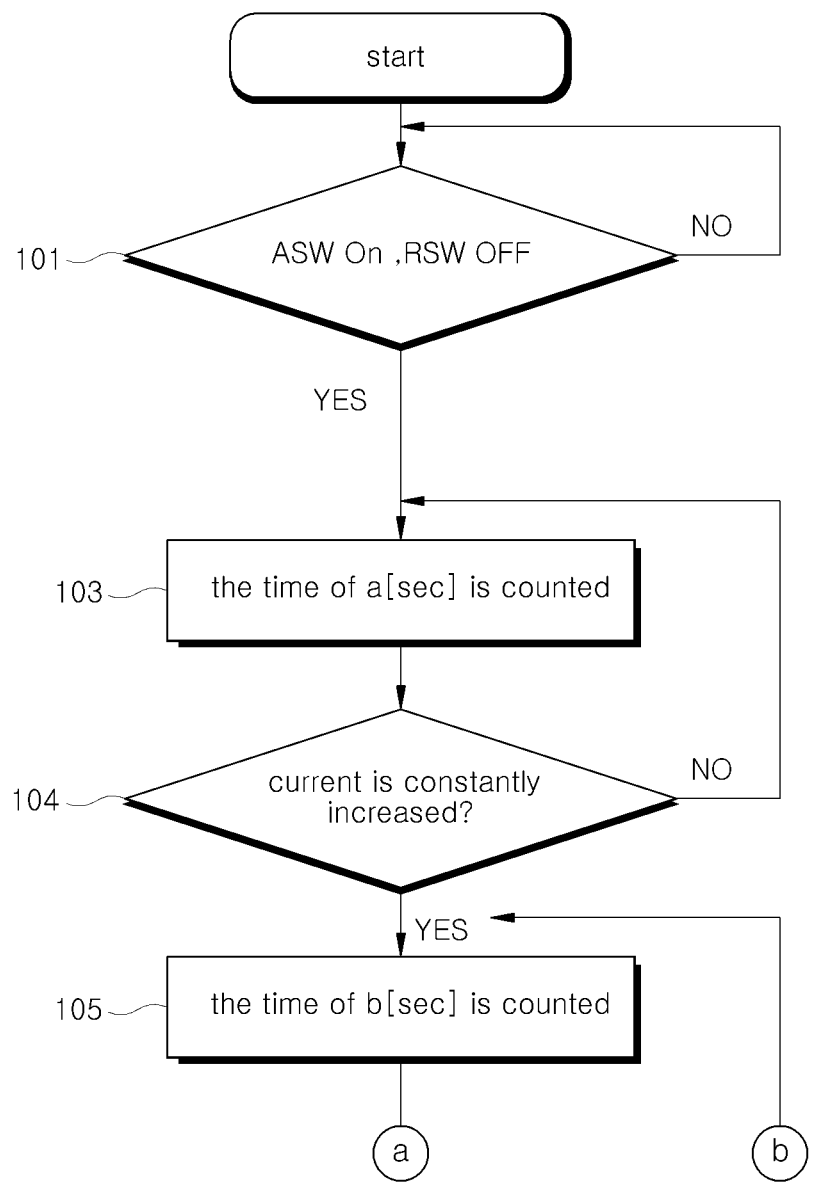
FIGS. 9 and 10 are a flowchart illustrating a control method of the electronic parking brake system according to the present invention.
Figure 10:
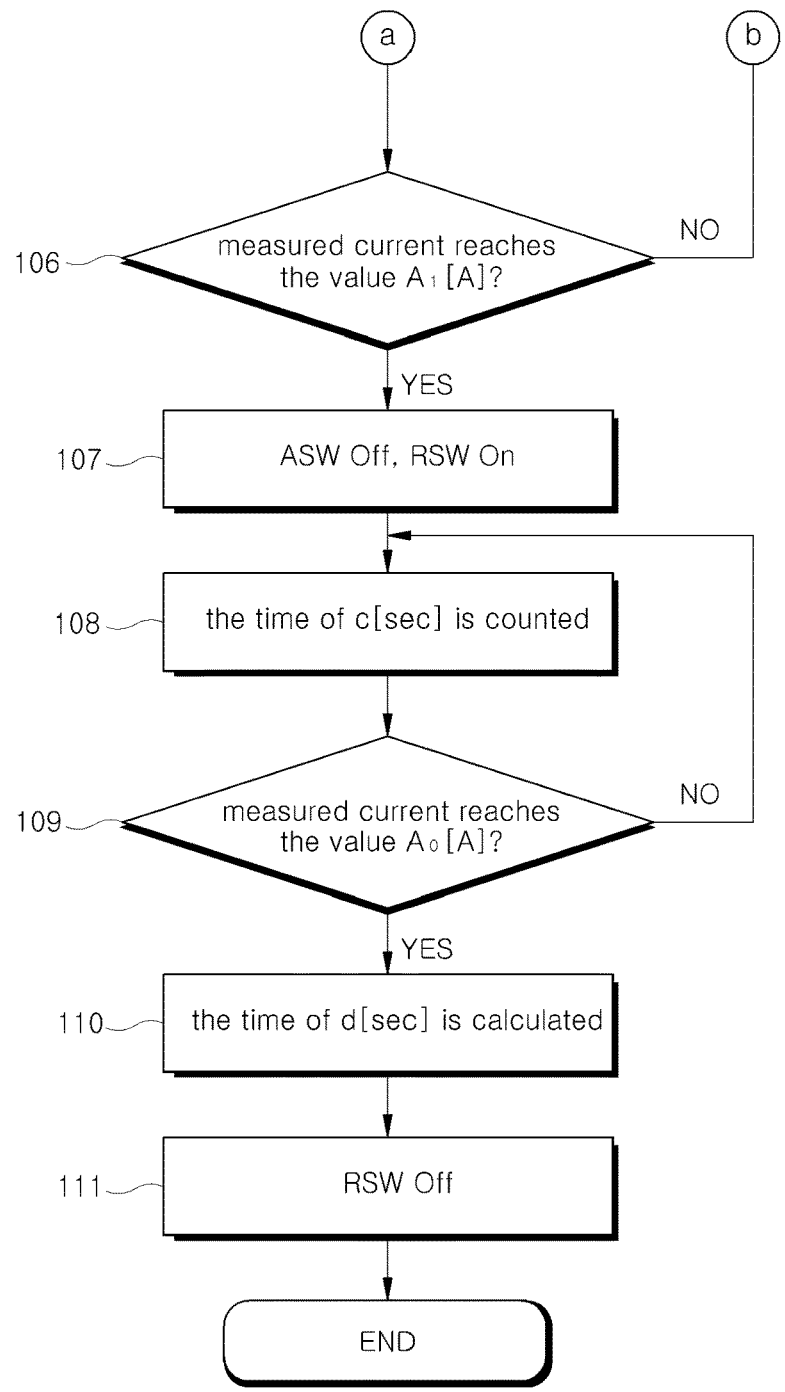

FIG. 9 is a flowchart illustrating a control method of the electronic parking brake system according to the present invention.

According to the embodiment, it is determined whether the applying switch ASW is in an ON state and the releasing switch RSW is in an OFF state (101).

When the applying switch ASW is in the ON state and the releasing switch RSW is in the OFF state (Yes in 101), the time of a[sec] which corresponds to a time from a point of time when the applying switch ASW is switched on until right before the current is constantly increased is counted, except a case in which the current has a spark (103).

That is, when the current is not constantly increased (No in 104), the time of a[sec] is continuously counted, and the time of a[sec] until the current is constantly increased may be calculated through the counting (103).

Then, the time of b[sec] is counted from a start point of time when the current is constantly increased (105).

Also, when the counting is started and a measured current reaches the value $A_1$ (Yes in 106), the applying switch ASW is switched off, and the releasing switch RSW is switched on (107).

The time of c[sec] is counted from a point of time when the releasing switch RSW is switched on (108). The time of c[sec] is counted until the measured current reaches $A_0$[A] (No in 109) (109).

When the measured current reaches $A_0$[A], the time of d[sec] is calculated using the a[sec], b[sec] and c[sec] calculated after the operation of the applying switch (ASW) and Equation 1 (110).

After the calculated time of d[sec] (110), the releasing operation is terminated, and thus the releasing switch RSW is switched off (111).

According to the embodiments of the present invention, the movement distance and the position of the spindle inside the parking brake can be estimated through a control algorithm for estimating the speed of the motor based on the current and the applied voltage of the motor, and thus the applying and releasing operation of the brake can be performed at an accurate time, and the accurate releasing point of time can be found.

Also, a conventional releasing time can be reduced by ensuring a point of time which is not affected by factors, such as the voltage and the pressure, having an influence on the drag phenomenon of the parking brake.

Accordingly, an error range of the spindle can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic parking brake system, comprising:
   a parking brake driving part applying or releasing a parking brake of a vehicle; and
   a control part controlling the parking brake driving part;
   wherein the control part ends an operation of releasing the parking brake based on a time interval of applying the parking brake, a time interval between an operation start point of releasing the parking brake and a time point when arrived on a predetermined current level, and a current applied to the parking brake.

2. The system of claim 1, wherein the control part controls an apply movement distance of spindle of the parking brake and a release movement distance of spindle of the parking brake to the same.

3. The system of claim 2, wherein the control part, controls a maximum distance in the applying operation of the spindle and the release movement distance of the spindle to the same when the parking brake is not applied within a normal range.

4. The system of claim 3, wherein the control part, after controls the maximum distance in the applying operation of the spindle and the release movement distance of the spindle to the same when determines the parking brake is not applied within the normal range, adjusts the release movement distance of the spindle is longer than the maximum distance in the applying operation of the spindle of the parking brake.

5. The system of claim 1, wherein the control part, determines a third movement distance of the spindle after the applied current arrived to the predetermined current level based on a first movement distance of the spindle when applies the brake, and a second movement distance of the spindle when releases the brake until the applied current arrived to the predetermined current level.

6. The system of claim 5, wherein the movement distance of the spindle is calculated based on a current applied to a motor and a voltage applied to the motor.

7. The system of claim 6, wherein the control part is configured to end the operation of releasing the parking brake after a movement time interval by calculated the movement time interval while the spindle moves the third movement distance.

8. A method of controlling an electronic parking brake, comprising:
   calculating a time interval of an operation of applying the parking brake;
   calculating a time interval between an operation start point of releasing the parking brake and a time point when arrived on a predetermined current level;
   measuring a current being applied in the parking brake; and
   ending an operation of releasing the parking brake based on the time interval of the operation of applying the parking brake, the time interval between the operation start point of releasing the parking brake and the time point when arrived on the predetermined current level, and the current applied to the parking brake.

9. The method of claim 8, wherein the ending the operation of releasing the parking brake comprises controlling an apply movement distance of spindle of the parking brake and a release movement distance of spindle of the parking brake to the same.

10. The method of claim 9, further comprising calculating a first movement distance of the spindle when applies the brake;

calculating a second movement distance of the spindle when releases the brake until the applied current arrived to the predetermined current level; and determining a third movement distance of the spindle after the applied current arrived to the predetermined current level based on the first movement distance of the spindle and the second movement distance of the spindle.

11. The method of claim 10, comprising ending the operation of releasing the parking brake after a movement time interval by calculated the movement time interval while the spindle moves the determined third movement distance.

12. The method of claim 9, comprising controlling a predetermined maximum distance in the applying operation of the spindle and the release movement distance of the spindle to the same when the parking brake is determined as not applied within a normal range.

13. The method of claim 12, comprising, after the controlling the predetermined maximum distance in the applying operation of the spindle and the release movement distance of the spindle to the same when the parking brake is determined as not applied within the normal range, adjusting the release movement distance of the spindle is longer than the predetermined maximum distance in the applying operation of the spindle of the parking brake.

* * * * *